US012639455B2

(12) United States Patent
Finkelshtein et al.

(10) Patent No.: US 12,639,455 B2
(45) Date of Patent: May 26, 2026

(54) CHIP CONTROL

(71) Applicant: MELLANOX TECHNOLOGIES, LTD., Yokneam (IL)

(72) Inventors: Dotan Finkelshtein, Yokneam Illit (IL); Michael Tahar, Yavne (IL); Irit Granovsky, Yokneam (IL); Yaniv Strassberg, Yokneam Illit (IL); Guy-Avraham Harel, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 200 days.

(21) Appl. No.: 18/142,968

(22) Filed: May 3, 2023

(65) Prior Publication Data

US 2024/0370579 A1     Nov. 7, 2024

(51) Int. Cl.
G06F 21/60 (2013.01)
G06F 21/62 (2013.01)
(52) U.S. Cl.
CPC ........ G06F 21/604 (2013.01); G06F 21/6209 (2013.01)

(58) Field of Classification Search
CPC .......................... G06F 21/604; G06F 21/6209
See application file for complete search history.

(56) References Cited

U.S. PATENT DOCUMENTS

| 11,914,726 B2 * | 2/2024 | Wallach | .................. | G06F 21/53 |
| 2022/0229784 A1 * | 7/2022 | Whyte | .................... | G06F 21/85 |

* cited by examiner

*Primary Examiner* — Esther B. Henderson
(74) *Attorney, Agent, or Firm* — Sheridan Ross P.C.

(57) ABSTRACT

A system, circuit, and method are described, among other things. An illustrative system is disclosed to include a processor and a memory storing data for processing by the processor. The data, when processed, causes the processor to receive an initiator message comprising a request to access one or more registers of a plurality of registers, determine that the initiator message corresponds to an entry of a privilege access table, determine a configured level of access control for the initiator message to access the one or more requested registers based at least in part on a group mapping table, and provide a level of access to the one or more requested registers corresponding to the received initiator message based on the initiator message corresponding to the entry of the privilege access table and based, at least in part, on the determined configured level of access control.

20 Claims, 4 Drawing Sheets

CHIP CONTROL

FIELD OF THE DISCLOSURE

The present disclosure is generally directed to networking systems, methods, and devices and, in particular, toward providing secure access in a control register fabric.

BACKGROUND

A processor register is a quickly accessible location available to a computer's processor. Registers usually consist of a small amount of fast storage, although some registers have specific hardware functions, and may be read-only or write-only. A register may hold an instruction, a storage address, or any kind of data (such as a bit sequence or individual characters). Items of data may be loaded from a main memory (e.g., static or dynamic random access memory (RAM)) into registers, where the data may be used for various operations (e.g., arithmetic operations, bitwise operations, etc.). After the operation, the data may be stored back into the main memory. A control register is a processor register that changes or controls the general behavior of a central processing unit (CPU) or other digital device. Common tasks performed by control registers include interrupt control, switching the addressing mode, paging control, and coprocessor control.

BRIEF SUMMARY

Embodiments of the present disclosure aim to provide access in a control register fabric, comprising: a processor; and a memory storing data for processing by the processor, the data, when processed, causes the processor to: receive an initiator message comprising a request to access one or more registers of a plurality of registers; determine that the initiator message corresponds to an entry of a privilege access table; determine a configured level of access control for the initiator message to access the one or more requested registers based at least in part on a group mapping table; and provide a level of access to the one or more requested registers corresponding to the received initiator message based on the initiator message corresponding to the entry of the privilege access table and based, at least in part, on the determined configured level of access control.

Example aspects include a circuit, comprising: a control register switch comprising external switching logic, a transaction control logic block, and internal switching logic; a processor; and a memory storing data for processing by the processor, the data, when processed, causes the processor to: receive an initiator message comprising a request to access one or more registers of a plurality of registers; determine that the initiator message corresponds to an entry of a privilege access table; determine a configured level of access control for the initiator message to access the one or more requested registers based at least in part on a group mapping table; and provide a level of access to the one or more requested registers corresponding to the received initiator message based on the initiator message corresponding to the entry of the privilege access table and based, at least in part, on the determined configured level of access control.

Example aspects also include a method for providing access in a control register fabric, comprising: receiving an initiator message comprising a request to access one or more registers of a plurality of registers; determining that the initiator message corresponds to an entry of a privilege access table; determining a configured level of access control for the initiator message to access the one or more requested registers based at least in part on a group mapping table; and providing a level of access to the one or more requested registers corresponding to the received initiator message based on the initiator message corresponding to the entry of the privilege access table and based, at least in part, on the determined configured level of access control.

Example aspects further include a computer-implemented method for providing access in a control register fabric, comprising: receiving an initiator message comprising a request to access one or more registers of a plurality of registers; determining that the initiator message corresponds to an entry of a privilege access table; determining a configured level of access control for the initiator message to access the one or more requested registers based at least in part on a group mapping table; and providing a level of access to the one or more requested registers corresponding to the received initiator message based on the initiator message corresponding to the entry of the privilege access table and based, at least in part, on the determined configured level of access control.

Any of the above example aspects include wherein the entry comprises a level of access control for the initiator message to access the one or more requested registers, wherein the privilege access table comprises a plurality of entries, each entry comprising an index number, a source identification mask, a privilege level mask, a starting address, an ending address, a respective level of access control, or a combination thereof.

Any of the above example aspects include wherein the group mapping table comprises a mapping of each of the plurality of registers to a respective functional group of a plurality of defined functional groups, wherein each of the defined functional groups corresponds to a respective level of access control for accessing each of the plurality of registers, and wherein the data stored in the memory that, when processed causes the processor to determine whether the initiator message corresponds to an entry of a privilege access table causes the system to: determine whether a source identification field in the initiator message matches a source identification mask of an entry in the privilege access table, a privilege level field in the initiator message matches a privilege level mask of the entry, and an address field in the initiator message is between a starting address and an ending address of the entry, wherein the level of access control for the initiator message to access the one or more requested registers comprises a corresponding level of access control for the entry in the privilege access table.

Any of the above example aspects include wherein the plurality of entries is ordered in the privilege access table according to a priority order as indicated by the index number for each entry, and wherein the data stored in the memory that, when processed causes the processor to determine whether the initiator message corresponds to an entry of a privilege access table causes the system to: identify a first occurring entry match in the privilege access table according to the priority order.

Any of the above example aspects include wherein the group mapping table comprises a set of privilege level masks defined per functional group of the plurality of defined functional groups, each privilege level mask corresponding to a respective level of access control.

Any of the above example aspects include wherein the data stored in the memory that, when processed causes the processor to determine the configured level of access control for the initiator message to access the one or more requested registers causes the system to: determine the configured level of access control from the set of privilege level masks for functional groups corresponding to the one or more requested registers based at least in part on a source identification field in the initiator message, a privilege level field in the initiator message, a read/write command field in the initiator message, or a combination thereof.

Any of the above example aspects include wherein the memory stores further data for processing by the processor that, when processed, causes the processor to: generate a register transaction based at least in part on receiving the initiator message, wherein the register transaction comprises an indication of an instruction point register corresponding to the one or more requested registers, the instruction point register determined based at least in part on an address of the one or more requested registers included within the initiator message.

Any of the above example aspects include wherein the address of the one or more requested registers comprises a same instruction pointer register that the initiator message is received within.

Any of the above example aspects include wherein the address of the one or more requested registers comprises a different instruction pointer register than the initiator message is received within.

Any of the above example aspects include wherein the memory stores further data for processing by the processor that, when processed, causes the processor to: convert the register transaction to a control register transaction based at least in part on the initiator message comprising a different architecture than a control register architecture.

Any of the above example aspects include wherein the memory stores further data for processing by the processor that, when processed, causes the processor to: generate a post transaction control logic for the initiator message based at least in part on determine whether the initiator message corresponds to an entry of the privilege access table, determining the configured level of access control for the initiator message to access the one or more requested registers based at least in part on the group mapping table, or a combination thereof, wherein the post transaction control logic comprises an indication of which registers of the plurality of registers are accessible by the initiator message.

Any of the above example aspects include wherein the post transaction control logic provides the level of access to the one or more requested registers corresponding to the received initiator message.

Any of the above example aspects include wherein the level of access enables read/write privileges within the one or more requested registers corresponding to the received initiator message.

Any of the above example aspects include wherein the entry comprises a level of access control for the initiator message to access the one or more requested registers wherein the privilege access table comprises a plurality of entries, each entry comprising an index number, a source identification mask, a privilege level mask, a starting address, an ending address, a respective level of access control, or a combination thereof.

Any of the above example aspects include wherein the group mapping table comprises a mapping of each of the plurality of registers to a respective functional group of a plurality of defined functional groups, wherein each of the defined functional groups corresponds to a respective level of access control for accessing each of the plurality of registers, and wherein the data stored in the memory that, when processed causes the processor to determine whether the initiator message corresponds to an entry of a privilege access table causes the processor to: determine whether a source identification field in the initiator message matches a source identification mask of an entry in the privilege access table, a privilege level field in the initiator message matches a privilege level mask of the entry, and an address field in the initiator message is between a starting address and an ending address of the entry, wherein the level of access control for the initiator message to access the one or more requested registers comprises a corresponding level of access control for the entry in the privilege access table.

Any of the above example aspects include wherein the group mapping table comprises a set of privilege level masks defined per functional group of the plurality of defined functional groups, each privilege level mask corresponding to a respective level of access control.

Any of the above example aspects include wherein the data stored in the memory that, when processed causes the processor to determine the configured level of access control for the initiator message to access the one or more requested registers causes the processor to: determine the configured level of access control from the set of privilege level masks for functional groups corresponding to the one or more requested registers based at least in part on a source identification field in the initiator message, a privilege level field in the initiator message, a read/write command field in the initiator message, or a combination thereof.

Any of the above example aspects include wherein the memory stores further data for processing by the processor that, when processed, causes the processor to: generate, via the external switching logic, a register transaction based at least in part on receiving the initiator message, wherein the register transaction comprises an indication of an instruction point register corresponding to the one or more requested registers, the instruction point register determined based at least in part on an address of the one or more requested registers included within the initiator message.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
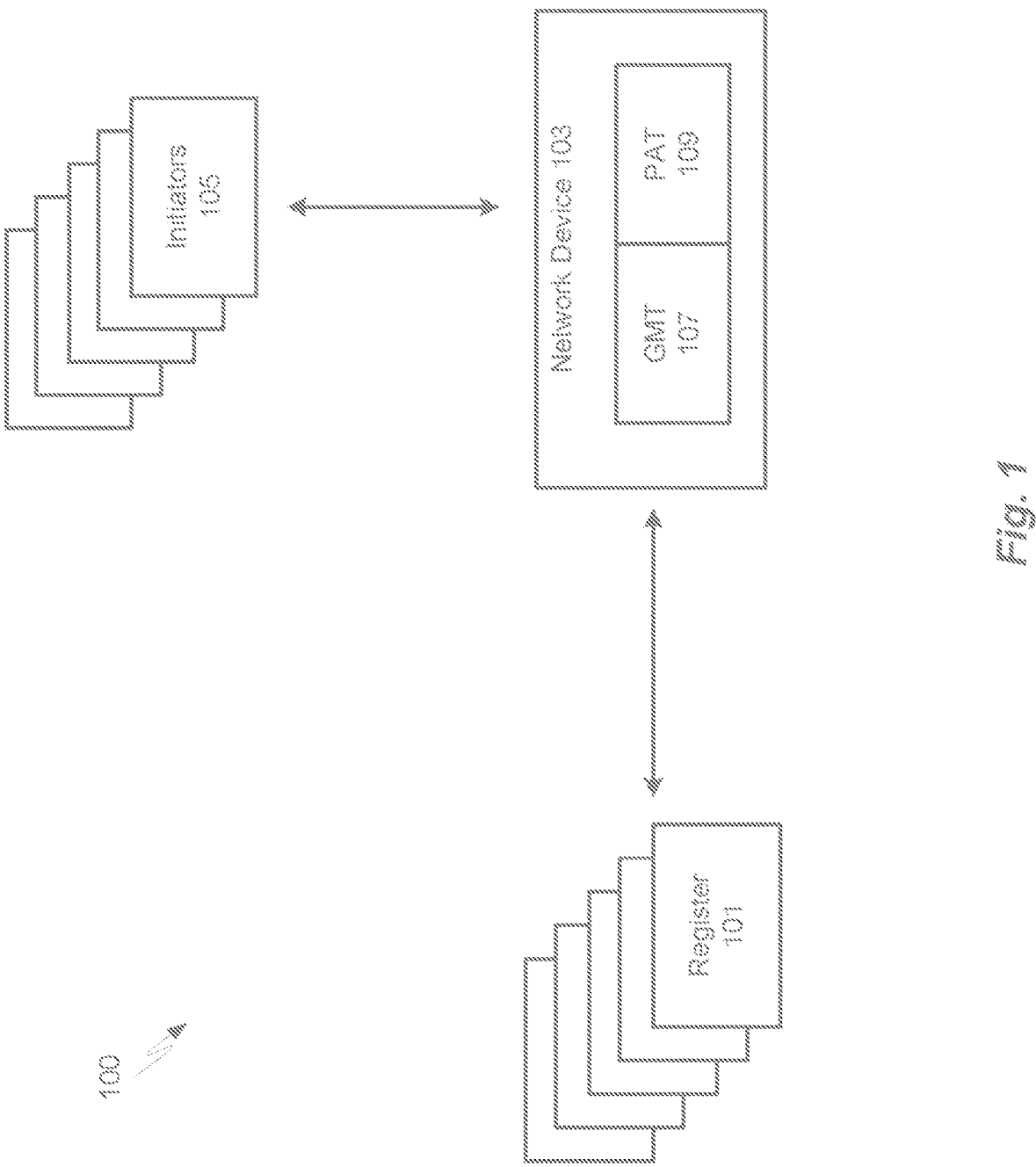
FIG. 1 illustrates a block diagram of a system for providing secure access in a control register fabric according to at least one example embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways.

Also, it is to be understood that the phraseology and terminology used herein is for the purpose of description and should not be regarded as limiting. The use of "including,"

"comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Chip architectures have a control register fabric so internal control registers can be accessed and controlled by software (e.g., firmware running on the processors within a chip). Those control registers can also be accessed from interfaces external to the chip (e.g., for debugging). Control registers may store sensitive information that needs to be secure. In secure devices, access control should be performed for every entity that can initiate a transaction towards the control register fabric. The present disclosure provides a scalable security architecture that will ensure the proper mapping of the control registers into different types. The mapping ensures the control registers have the proper access for a given transaction, based on its initiator.

The present disclosure provides a more centralized approach for chip register access control, by mapping the control registers into functional groups, which can later be used to differentiate the security policy. The present disclosure supports both centralized but also "local" security control enforcement. In other words, the mapping of the control registers into function groups is done in a centralized device. In contrast, local privilege level masks (PLMs) allow registers not associated with a functional group to be assigned using access policy. Additionally, the present disclosure provides configurable permission access tables that can be used when post silicon changes are needed. The control fabric register enables the sharing of Internet Protocols (IPs) between business units while not compromising on security.

FIG. 1 illustrate a system 100 that provides secure access in a control register fabric. System 100 includes register(s) 101, a network device 103, and initiators 105. The network device 103 includes a group mapping table (GMT) 107 and a privilege access table (PAT) 109. A processor often contains several kinds of registers 101, which can be classified according to the types of values they can store or the instructions that operate on them. For example, a group of registers gathers all static secrets that a network device 103 holds. In another example, a group of registers gathers all "destructive reads" of the network device 103 (e.g., when read, by the registers, the value can be changed/deleted). The system 100 may include many transaction initiators 105 (both internal and external), and the access of each initiator should be restricted according to functionality. Examples of the initiators 105 may include software/firmware, external interfaces, etc.

Logic within the network device 103 performs access control for each initiator message received (e.g., each transaction towards the control register fabric). In embodiments, the network device 103 receives an initiator message from an initiator 105. The initiator message requests to access one or more registers 101. The network device 103 determines that the initiator message corresponds to an entry of the privilege access table 109. The network device 103 further determines a configured level of access control for the initiator message to access the one or more requested registers 101 based at least in part on a group mapping table 107. The network device 103 further provides a level of access to the one or more requested registers 101 corresponding to the received initiator message based on the initiator message corresponding to the entry of the privilege access table 109 and based, at least in part, on the determined configured level of access control.

The network device 103 may also generate a register transaction based at least in part on receiving the initiator message, wherein the register transaction comprises an indication of an instruction point register corresponding to the one or more requested registers 101, the instruction point register determined based at least in part on an address of the one or more requested registers 101 included within the initiator message. The address of the requested register 101 may be the same or different instruction pointer register that the initiator message is received within. The network device 103 may also convert the register transaction to a control register transaction based at least in part on the initiator message comprising a different architecture than a control register architecture.

In embodiments, the network device 103 may generate a post transaction control logic for the initiator message based at least in part on determining whether the initiator message corresponds to an entry of the privilege access table 109, determining the configured level of access control for the initiator message to access the requested registers 101 based at least in part on the group mapping table 107. In embodiments, the post transaction control logic comprises an indication of which registers 101 are accessible by the initiator message.

Figure 2:
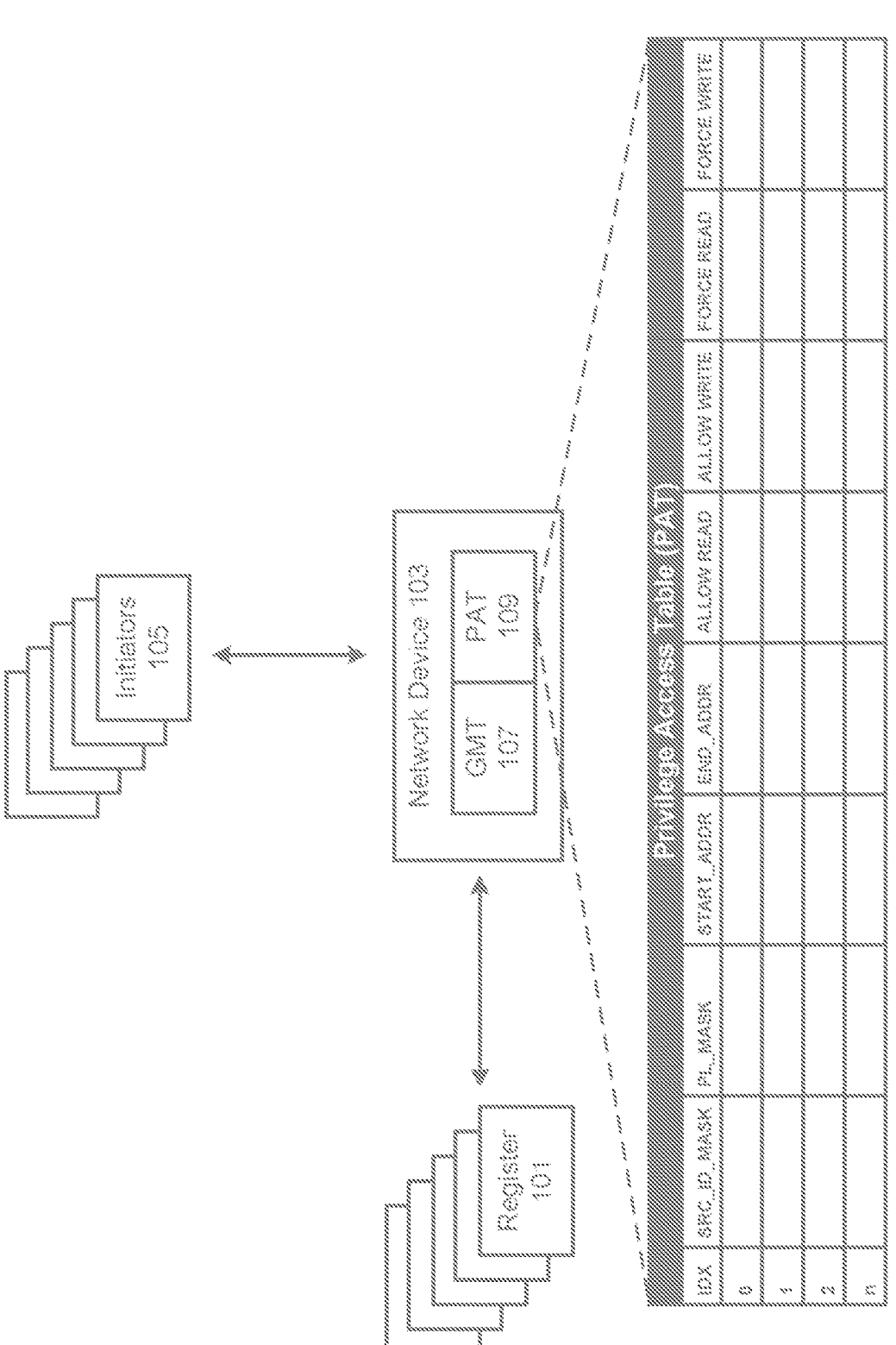
FIG. 2 illustrates a more detailed block diagram of the system for providing secure access in a control register fabric according to at least one example embodiment of the present disclosure.

In embodiments, a Privilege Access Table (PAT) 109 blocks/allows access to specific address ranges within this IP. In other words, the PAT 109 may be used to bypass or further restrict access to specific address ranges. As illustrated in FIG. 2, the PAT 109 includes columns "IDX" (an index number), a source identification mask, a privilege level mask, a starting address, an ending address, a respective level of access control (e.g., allow read/write, force read/write), or a combination thereof.

The entries in the PAT 109 may be ordered according to a priority order as indicated by the index number (IDX). In embodiments, the network device 103 may identify a first occurring entry match in the privilege access table 109 according to the priority order.

Figure 3:
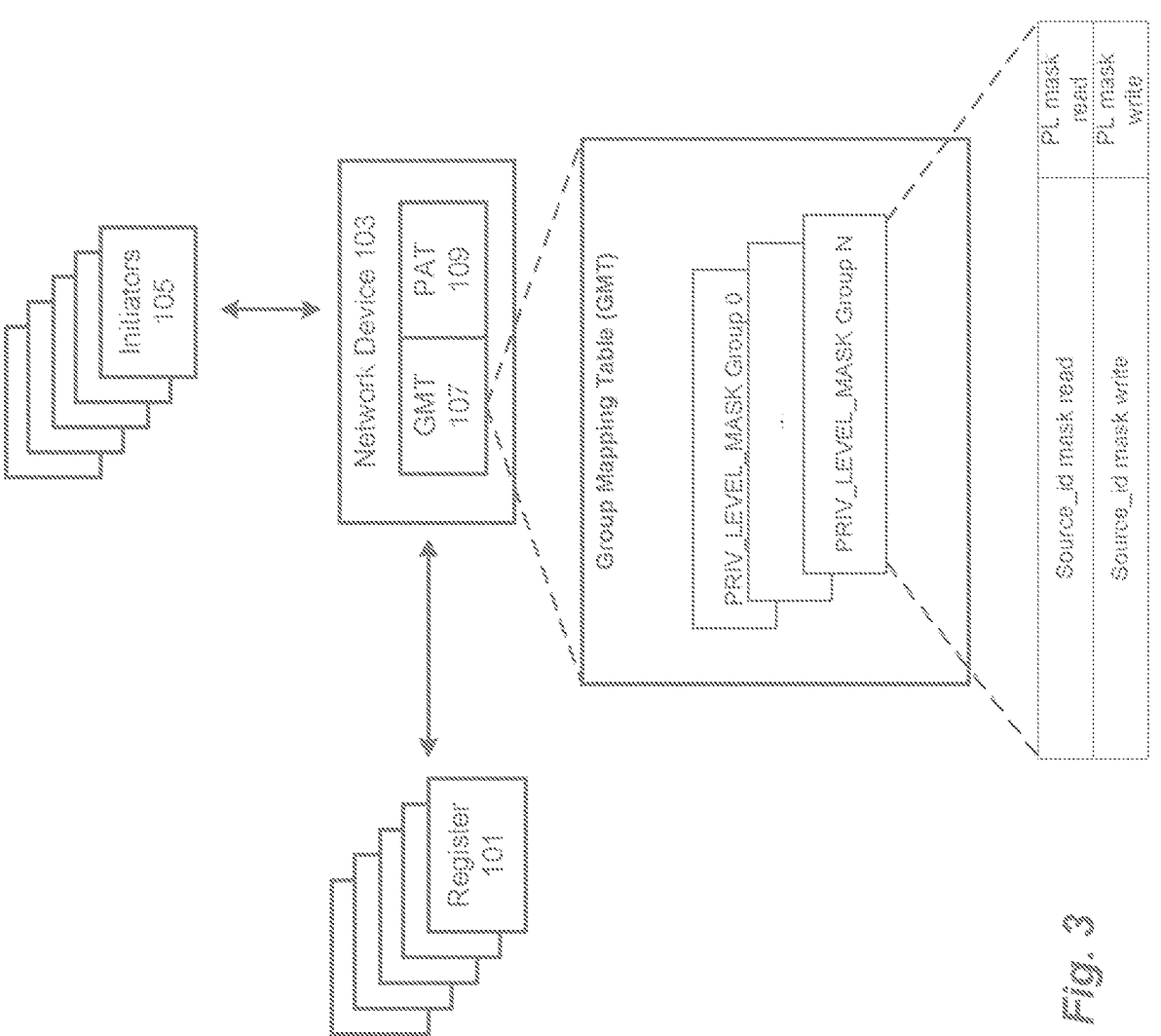
FIG. 3 illustrates another detailed block diagram of the system for providing secure access in a control register fabric according to at least one example embodiment of the present disclosure.

Control registers are divided into meaningful groups without needing to know all possible initiators on the chip and their privilege level. For example, the registers 101 are grouped into different types, with each group being accessible by different initiators 105. FIG. 3 illustrates an example Group Mapping Table (GMT) 107, which contains PLMs (Privilege Level Mask) registers. Each PLM will represent a group type. PLMs may be defined per functional group, with each PLM corresponding to a respective level of access control. For example, within a PLM the transaction can be blocked based on a source identification field in the initiator message, a privilege level field in the initiator message, a read/write command field in the initiator message, or a combination thereof. The mapping ensures the control registers have the right access for a given transaction, based on its initiator. In embodiments, the PLMs are supported at both an IP level and a register level.

In embodiments, the GMT 107 includes a mapping of each of the registers 101 to a respective functional group. Each functional group corresponds to a respective level of access control for accessing each of the plurality of registers. For example, the network device 103 may determine whether a source identification field in the initiator message matches a source identification mask of an entry in the privilege access table 109, a privilege level field in the initiator message matches a privilege level mask of the entry, and an address field in the initiator message is between a starting address and an ending address of the entry. The level of access control for the initiator message to access the one or more requested registers 101 comprises a corresponding level of access control for the entry in the privilege access table 109.

Figure 4:
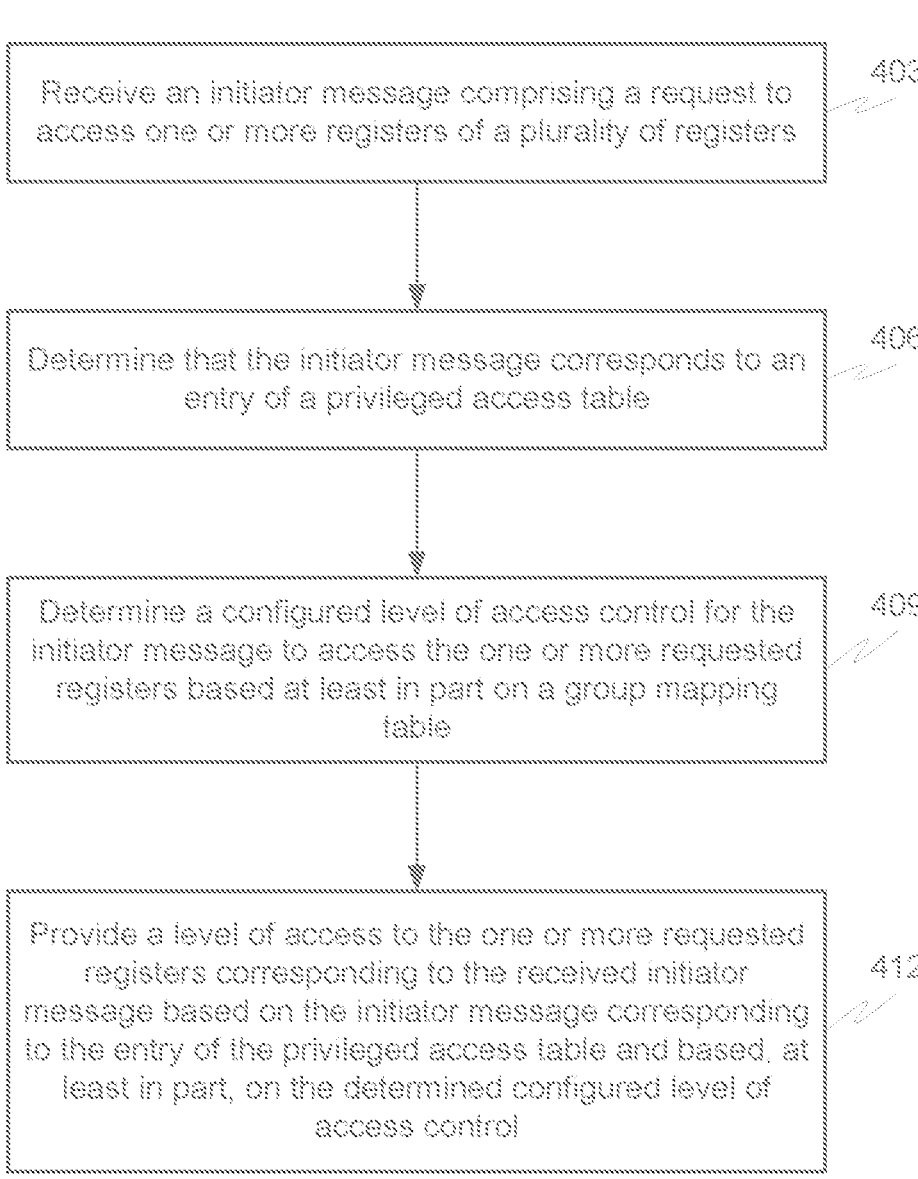
FIG. 4 illustrates a method of providing secure access in a control register fabric according to at least one example embodiment of the present disclosure.

In some embodiments, a method 400 such as illustrated in FIG. 4 may be performed in accordance with one or more of the systems described herein.

The method 400 may begin at step 403 with a network device receiving an initiator message comprising a request to access one or more registers of a plurality of registers. For example, an initiator 105 sends an initiator message to the network device 103.

At step 406, the network device (e.g., network device 103) may determine that the initiator message corresponds to an entry of a privileged access table (e.g., PAT 109).

At step 409, the network device (e.g., network device 103) may determine a configured level of access control for the initiator message to access the one or more requested registers based at least in part on a group mapping table (e.g., GMT 107).

At step 412, the network device (e.g., network device 103) may provide a level of access to the one or more requested registers (e.g., registers 101) corresponding to the received initiator message based on the initiator message corresponding to the entry of the privileged access table and based, at least in part, on the determined configured level of access control.

Any of the steps, functions, and operations discussed herein can be performed continuously and automatically.

The exemplary systems and methods of this disclosure have been described in relation to a network device. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, sub combinations, and sub-sets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for providing access in a control register fabric, comprising:
  a processor; and
  a memory storing data for processing by the processor, the data, when processed, causes the processor to:
    receive an initiator message comprising a request to access one or more registers of a plurality of registers;
    determine, from an entry of a privilege access table, an address range of the plurality of registers that are accessible by the initiator message;
    determine, from a group mapping table that maps groups of registers to different functions, a privilege level for the initiator message; and
    provide, for the initiator message, a level of access to the one or more requested registers based on the determined address range and the determined privilege level.

2. The system of claim 1, wherein the privilege access table comprises a plurality of entries, each entry comprising an index number, a source identification mask, a privilege level mask, a starting address, an ending address, a respective privilege level, or a combination thereof.

3. The system of claim 2, wherein the data stored in the memory, when processed, causes the processor to:
  determine whether a source identification field in the initiator message matches a source identification mask of an entry in the privilege access table, a privilege level field in the initiator message matches a privilege level mask of the entry, and an address field in the initiator message is between a starting address and an ending address of the entry.

4. The system of claim 1, wherein the privilege access table comprises a plurality of entries ordered according to a priority order as indicated by an index number for each entry, and wherein the data stored in the memory, when processed, causes the processor to:
  identify a first occurring entry match in the privilege access table according to the priority order.

5. The system of claim 3, wherein the group mapping table comprises a set of privilege level masks defined per function, and wherein each privilege level mask corresponds to a respective privilege level.

6. The system of claim 5, wherein the data stored in the memory, when processed, causes the processor to:
  determine the privilege level from the set of privilege level masks based at least in part on a source identification field in the initiator message, a privilege level field in the initiator message, a read/write command field in the initiator message, or a combination thereof.

7. The system of claim 1, wherein the memory stores further data for processing by the processor that, when processed, causes the processor to:

generate a register transaction based at least in part on receiving the initiator message, wherein the register transaction comprises an indication of an instruction pointer register corresponding to the one or more requested registers, the instruction pointer register being determined based at least in part on an address of the one or more requested registers included within the initiator message.

8. The system of claim 7, wherein the address of the one or more requested registers comprises a same instruction pointer register that the initiator message is received within.

9. The system of claim 7, wherein the address of the one or more requested registers comprises a different instruction pointer register than the initiator message is received within.

10. The system of claim 1, wherein the memory stores further data for processing by the processor that, when processed, causes the processor to:

convert a register transaction to a control register transaction based at least in part on the initiator message comprising a different architecture than a control register architecture.

11. The system of claim 1, wherein the memory stores further data for processing by the processor that, when processed, causes the processor to:

generate a post transaction control logic for the initiator message based at least in part on determining whether the initiator message corresponds to an entry of the privilege access table, wherein the post transaction control logic comprises an indication of which registers of the plurality of registers are accessible by the initiator message.

12. The system of claim 11, wherein the post transaction control logic provides the level of access to the one or more requested registers corresponding to the received initiator message.

13. The system of claim 1, wherein the level of access enables read/write privileges within the one or more requested registers for the received initiator message.

14. A circuit, comprising:

a control register switch comprising external switching logic, a transaction control logic block, and internal switching logic;

a processor; and a memory storing data for processing by the processor, the data, when processed, causes the processor to:

receive an initiator message comprising a request to access one or more registers of a plurality of registers;

determine, from an entry of a privilege access table, an address range of the plurality of registers that are accessible by the initiator message;

determine, from a group mapping table that maps groups of registers to different functions, a privilege level of for the initiator message; and provide, for the initiator message, a level of access to the one or more requested registers based on the determined address range and the determined privilege level.

15. The circuit of claim 14, wherein the privilege access table comprises a plurality of entries, each entry comprising an index number, a source identification mask, a privilege level mask, a starting address, an ending address, a respective level of access control, or a combination thereof.

16. The circuit of claim 15, wherein the data stored in the memory, when processed, causes the processor to:

determine whether a source identification field in the initiator message matches a source identification mask of an entry in the privilege access table, a privilege level field in the initiator message matches a privilege level mask of the entry, and an address field in the initiator message is between a starting address and an ending address of the entry, wherein the level of access control for the initiator message to access the one or more requested registers comprises a corresponding level of access control for the entry in the privilege access table.

17. The circuit of claim 16, wherein the group mapping table comprises a set of privilege level masks defined per function, and wherein each privilege level mask corresponds to a respective privilege level.

18. The circuit of claim 17, wherein the data stored in the memory, when processed, causes the processor to:

determine the privilege level based at least in part on a source identification field in the initiator message, a privilege level field in the initiator message, a read/write command field in the initiator message, or a combination thereof.

19. The circuit of claim 14, wherein the memory stores further data for processing by the processor that, when processed, causes the processor to:

generate, via the external switching logic, a register transaction based at least in part on receiving the initiator message, wherein the register transaction comprises an indication of an instruction pointer register corresponding to the one or more requested registers, the instruction pointer register being determined based at least in part on an address of the one or more requested registers included within the initiator message.

20. A method for providing access in a control register fabric, comprising:

receiving an initiator message comprising a request to access one or more registers of a plurality of registers;

determining, from an entry of a privilege access table, an address range of the plurality of registers that are accessible by the initiator message;

determining, from a group mapping table that maps groups of registers to different functions, a privilege level for the initiator message; and providing, for the initiator message, a level of access to the one or more requested registers based on the determined address range and the determined privilege level.

* * * * *